Nov. 13, 1951  G. S. BOUVIER ET AL  2,575,092
MACHINE FOR CONTINUOUS MOLDING
Filed Feb. 17, 1948  3 Sheets-Sheet 1

Inventors:
Gabriel Stanislas Bouvier and
Roger Pierre Clair

Nov. 13, 1951 G. S. BOUVIER ET AL 2,575,092
MACHINE FOR CONTINUOUS MOLDING
Filed Feb. 17, 1948 3 Sheets-Sheet 3

Patented Nov. 13, 1951

2,575,092

UNITED STATES PATENT OFFICE 2,575,092

MACHINE FOR CONTINUOUS MOLDING

Gabriel Stanislas Bouvier, Gentilly, and Roger Pierre Clair, Paris, France

Application February 17, 1948, Serial No. 9,295
In France February 22, 1947

3 Claims. (Cl. 25—99)

The invention deals with a machine for the continuous moulding of parts, more particularly panels constituted by parallelopipeds that may be solid or tubular.

The object of the invention is to allow the manufacture of a wide range of parts that are indicated more especially for the formation of the inner dividing walls of buildings.

The main characteristic of the invention lies in the fact that the machine is made up of an endless type of mould formed by two hinged or moving walls between which is poured the compound out of which the parts are to be made; fittings constituting the half-bottom pieces of the mould sections are fixed at regular spaces along the walls; the two walls of the mould are kept moving in suitable guides so as to make certain that the two walls preserve the same distance apart throughout the operation; the use of electrodynamic power is recommended to ensure the automatic adjustment of the unwinding rate of the two endless walls; the space between the two walls may be varied; suitable means are introduced to prevent the moulded parts from sticking to the walls; the upper portion at least of the endless moulding machine is subjected to vibration so as to get a close packing of the moulding compound.

A further characteristic, also, of the invention, in the event of tubular panels being required in place of the solid ones, lies in the use of a feeding means that delivers in regular sequence successive cores into the mould; these cores, too, are directed by sloping approaches that impart a threefold motion to the cores: driving at a varying circumferential speed, centripetal movement and rotation; furthermore the cores are formed in two portions diverging coaxially from each other for the de-coring of the moulded part.

We will now disclose our invention with reference to accompanying drawing, wherein.

Figure 1:
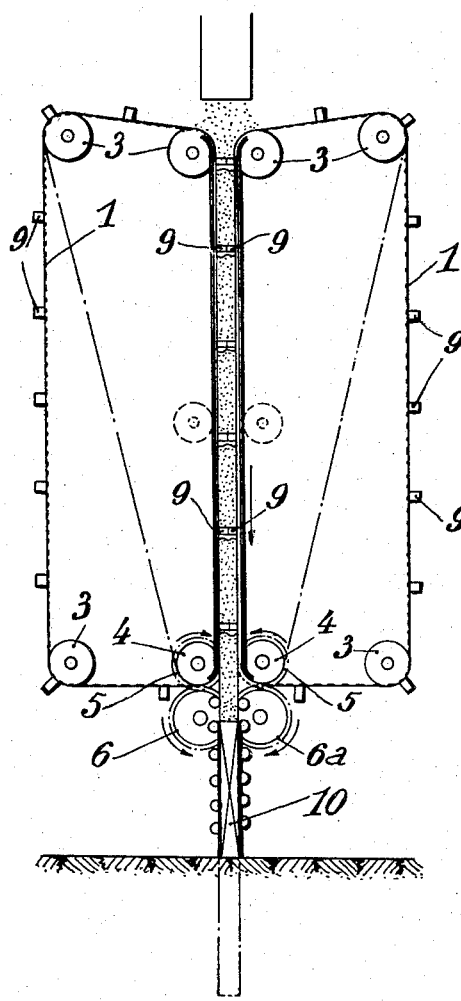
Fig. 1 is a diagrammatic side elevational view of the machine.
Figure 2:
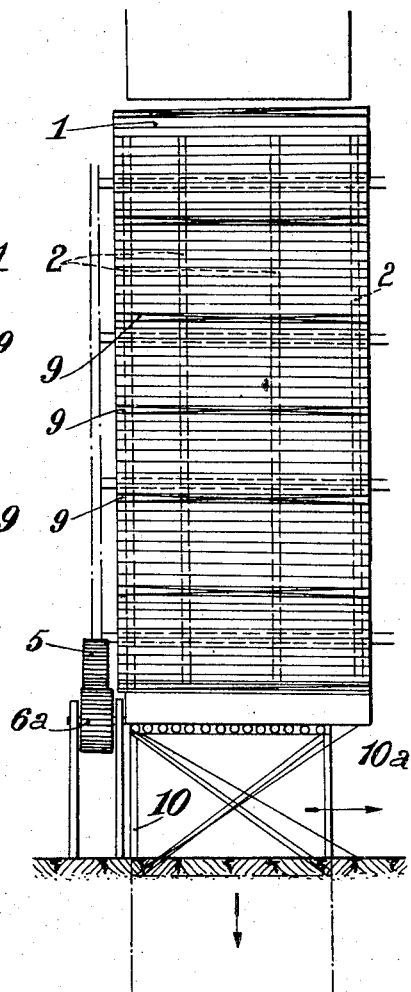
Fig. 2 is a front view thereof.

The machine illustrated in Figs. 1 and 2 includes a continuously downwardly moving mold defined by two endless belts 1 registering with one another along the inner vertical downwardly directed portion of their paths. Said belts include a plurality of interconnected members forming a sprocket chain 2 and engaging idle pinions 3 and further pinions 4 keyed to the spindles of wheels 5 meshing respectively with further wheels 6 of which one 6a forms the driving wheel. Said driving wheel is in its turn connected operatively with a prime mover so as to constrain the cooperating vertical surfaces of the belt to move downwardly in unison.

Figure 5:
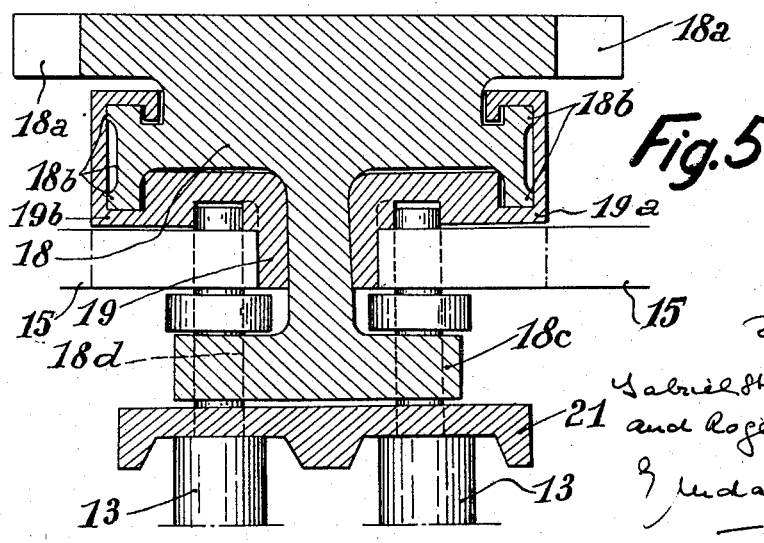
Fig. 5 is a horizontal cross-section of said mechanism perpendicularly to the plane of Fig. 4.

Suitable guides shown in dotted lines at 7 are provided for the downward movement of the belt 1. Above the mold defined by the two downwardly moving surfaces considered and that is closed laterally through plates such as that illustrated at 21 in Fig. 5 is arranged a feeder 8 adapted to project into the mold the material, preferably plaster of Paris, that is to be molded. In the case of plaster, the latter is caused to drop into the mold between the downwardly moving surfaces to settle inside the mold as quickly as possible before it sets, vibrating means being associated with the moving surfaces to further this settling.

For the definition of the molded parts, as to size, there are provided at spaced intervals on the outside of the belts short bars such as 9 that project towards one another in the interval between the surfaces of the downwardly directed strands of the belt through one half the distance between said surfaces. Obviously, the belts are adjusted with reference to one another so that the outer ends of the cooperating bars may register with one another inside the mold channel defined between said strands. Thus the bars 9 abutting against one another as illustrated form the separation between the successive elementary molds defined between the said strands.

The molded elements formed between the successive abutting bar systems are collected at the lower end of the molding channel by a vertically movable load carrier 10 that is adapted to remove the elements in succession onto a sloping runway 10a for discharging them automatically under the action of gravity over said sloping runway.

In order to suitably settle the plaster of Paris or the like material in the elementary molds, it is preferable to provide for a suitable vibrator on the machine at a suitable location.

The operation of the machine is as follows: the mass of material delivered from the feeder 8 and storing up a substantial amount of kinetic energy fills the elementary mold that is located immediately underneath the feeder and is submitted to the action of the vibrator for expediting its settling. The setting of the plaster in the elementary mold is obtained during the downward movement of said mold and the molded material is caused to become very rigid by reason of the fact that it cannot expand to any substantial extent inside the elementary mold. It moves downwardly and is discharged as disclosed onto the carrier 10 and runaway 10a. When the molded element has to be cut, there is associated to the arrangement disclosed a further downwardly sloping surface leading the element to the sawing yard under constant acceleration conditions.

Figure 3:
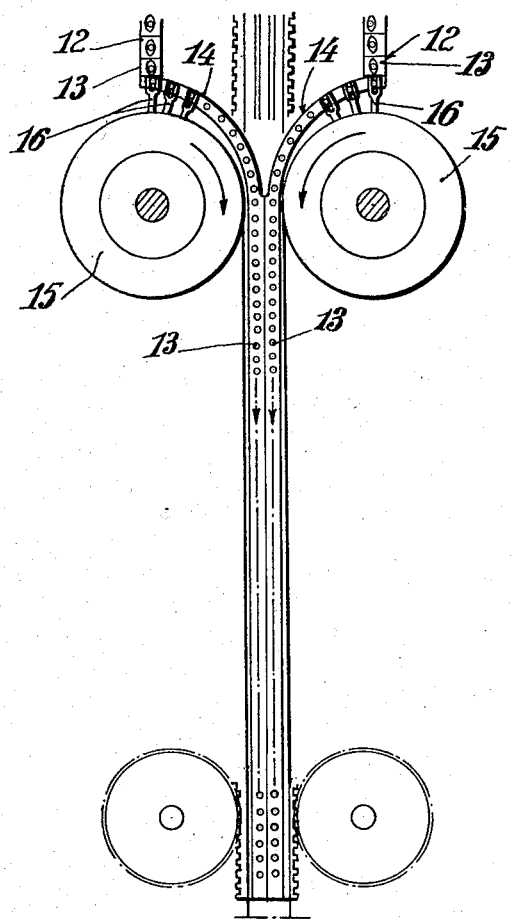
Fig. 3 is a diagrammatic side elevational showing of the core inserting mechanism advantageously associated with the machine.
Figure 4:
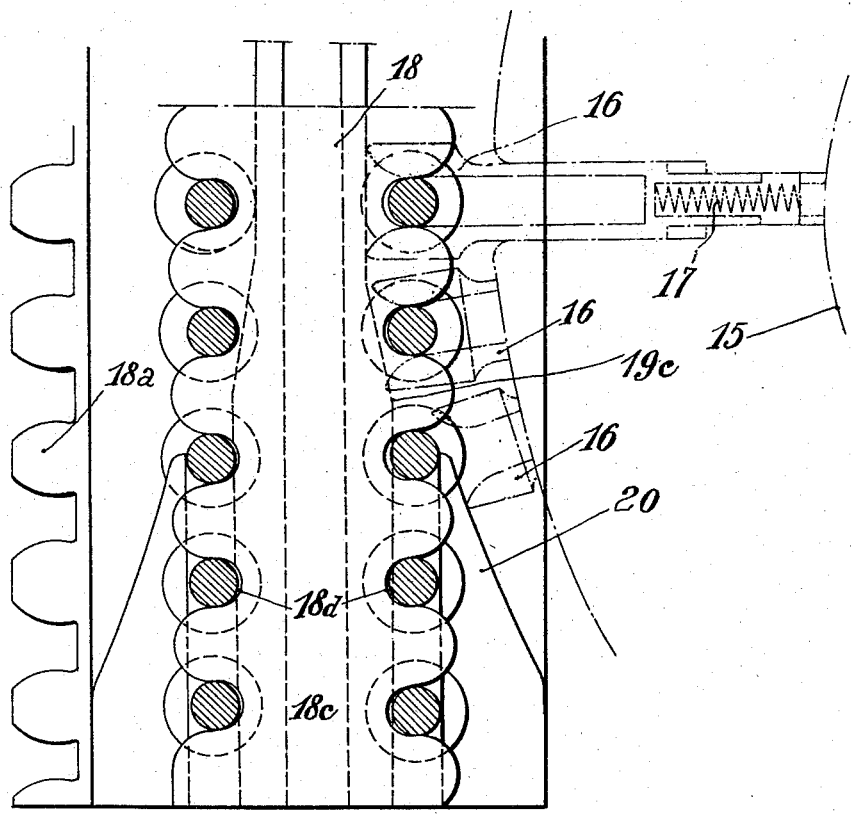
Fig. 4 is a detail thereof on a larger scale, also in side elevational view.

When it is desired to use the machine for the production of tubular parts, that is parts provided with a number of suitably distributed perforations of predetermined size, an auxiliary mechanism is incorporated to the machine as illustrated in Figs. 3 to 5. As shown, the cores adapted to form the perforations considered in the molded elements are distributed by a distributor or distributors 12 containing superposed cores 13; an arcuate slideway for the cores guides them from the lower end of the distributor into the corresponding side of the molding channel; they are guided in each arcuate channel by means of forks 16 arranged with a sliding fit in radial slots of the wheel 15 that is coaxial with the arcuate guiding channel. As shown with further detail in Fig. 4, each fork is submitted to the action of a spring 17 urging it away from the center of the wheel 15 so that it may hold the cores between its ends inside the arcuate guideway. This guideway continues as a matter of fact underneath the horizontal diameter of the wheel 15 as shown in Fig. 4; this has for its object to urge the forks away from the vertical line along which the successive cores fed by the upper part of the arcuate guiding channel are caused to drop; to this purpose, the different cores are guided along their path synchronously with the sinking movement of the mold by a succession of superposed guiding members 18 adapted to slide to either side of the mold channel in the vertical plane of operation of forks 16. It will be readily understood that the cores are allowed to enter in succession the members 18 through flaring lateral notches in the latter as they pass out of the part of the guideway 14 lying above the horizontal diameter of the wheel 15. Beyond said diameter, the cores continue being held inside the notches in a member 18 while the forks 16 are moved away from them through the continuation of the guiding channel 14, the cores and the forks being guided in opposite directions by the member 20 that separates the guiding channels for the forks from the line of progression of the cores.

A member 18 is shown cross-sectionally with further detail in Fig. 5 as including lateral vertical rack members 18a, two smooth metal facings 18b arranged vertically in planes perpendicular to the plane of Figs. 3 and 4 and finally a front projection 18c provided with transversal flaring notches 18d for holding the corresponding ends of the cores 13 fed thereto by the wheels 15. The member 18 considered has a height equal to that of a mold element and consequently of one of the tubular molded parts to be obtained.

The superposed members 18 are fitted inside a stationary slideway member 19 made of two co-operating parts 19a and 19b. In the case illustrated, two cores are delivered simultaneously to the corresponding notches provided to either side of the successive downwardly moving members 18 this being done as stated through the operation of the progressively advancing radial forks 16 carried along by the wheels 15 and registering with the successive notches facing them. The cores move out of said forks as disclosed into said notches and are guided along the inner wall 19c of the stationary slideway member 19 against which wall the ends of the forks 16 at first slide until the counterslide member 20 separates finally the cores that remain in the notches of the members 18 from the actual forks that recede into the guiding channel 14 as fully apparent in Fig. 4.

Fig. 5 shows more particularly the arrangement of two associated cores 13 extending partly outside the lateral closing plate 21 of the mold, which plates 21 provide for the lateral water-tightness of the downwardly moving mold on the corresponding sides thereof. Said cores are constituted as disclosed in our copending U. S. specification 34,956 by an operative small diameter part and outer larger diameter annular parts fitted over or rigid with at least one end of the former part. These cores are locked in position by auxiliary grooves in the slideway member 19 so as to be housed in a well determined position inside the notches of the downwardly moving members 18. The release of the cores after molding is carried out in front of a point near the bottom of the slideway 19 that is provided with a lateral opening for said release. When the member 18 that is driven downwardly in unison with the actual mold belts through the synchronous operation of pinions 22 engaging the vertical rack 18a the core is caused to move longitudinally out of the molded material that has set in the meantime, by any suitable means. For instance, the cores may be submitted to the action of a mechanically operating guiding member or again the attraction of an electromagnet that is energized at a suitable moment through the very operation of the machine, said electromagnet being subsequently deenergized through the actuation of a switch by the member 18 carrying the cores under consideration.

The cores shown as formed by coaxial portions and the devices disclosed have been illustrated only to one side of the plane of symmetry of the apparatus shown in Figs. 3 and 4. It will be immediately appreciated that Fig. 5 should be completed by a symmetrical part including the same elements or parts of elements as those actually illustrated.

The members 18 may form a sequence of interconnected members that may be caused to move away from the mold in a direction perpendicular to the plane of Fig. 4 in order to remove mechanically the cores that are thenafter guided over suitable slopes. As stated, this release may be associated with or replaced by electromagnetic attraction. The members 18 arriving at the bottom of their stroke are taken up through some contrivance that forms no part of the invention and are returned back for operation at the upper end of the mold.

Figure 6:
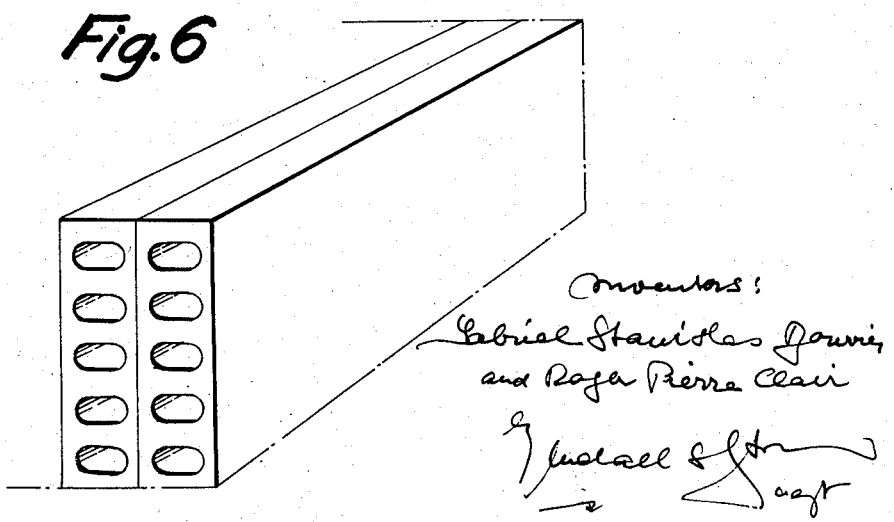
Fig. 6 shows by way of example a perforated structural element that may be obtained in the said machine.

The molded part obtained that is illustrated in Fig. 6 may be sawn through, transversely or longitudinally so as to produce two separate structural elements.

The different members of the machine are of course driven synchronously through any prime mover, said members including the wheels 15 and also the further pinions 22 engaging the racks 18a on the members 18 for controlling their downward movement.

The timing of the input movement of the cores and of the members 18 is provided in a manner such that these cores and members may act synchronously with the progression of the two cooperating mold enclosing walls. The cooperating wheels 15 and pinions 22 are keyed respectively to the axes of the wheels 3 and 5 (Fig. 1) that provide for the translational movement of the endless belt 1.

It will be apparent that the precedingly disclosed machine allows obtaining structural parts the net cost of which is very much below what can be obtained with other methods while the labor required is very small and furthermore the machine may work in a continuous manner. Moreover molded elements obtained with said machine require only a reduced amount of raw material that may be about 2½ times less for equal surface areas as compared with prior practice. Such structural elements allow an assembling that lowers to a marked degree the net cost of building on which said new structural elements are employed.

Obviously our invention is not limited to the embodiments described hereinabove and it covers all modifications thereof that fall within the scope of accompanying claims.

What we claim is:

1. A machine for the continuous molding of parallelopipedic and the like structural elements comprising two endless wall-forming surfaces adapted to move along paths including vertical portions, said vertical portions of the two surfaces lying in front of one another at a predetermined distance corresponding to the width of the structural elements to be obtained, means for driving in unison the two surfaces so that they execute simultaneous equal downward movements through the vertical portions of their paths, transversal bars projecting to the outside of each surface at predetermined equal intervals through a distance such that each pair of cooperating bars when engaging simultaneously the channel defined between the two vertical portions of said paths may register accurately and form the bottom of an elementary mold, lateral walls closing the channel formed between the two surfaces in the vertical portion of their paths, means for dropping material adapted to set into the upper end of said channel between the two vertical portions of the paths and means for removing the finished elements from the lower part of the said passage, means for inserting cores at regular intervals into the uppermost mold compartments defined by the moving walls and the last bars that have entered the channel between same for forming the bottom of said mold compartment, last mentioned means including slopes arranged to either side of the vertical portions of the paths of the wall surfaces symmetrically thereof, wheels arranged symmetrically to either side of the vertical wall surfaces and adapted to rotate round horizontal axes parallel to said surfaces and radial jaws fitted yieldingly in said wheels and adapted to guide the cores passing over the slopes into the uppermost mould.

2. A machine for the continuous molding of parallelopipedic and the like structural elements comprising two endless wall-forming surfaces adapted to move along paths including vertical portions, said vertical portions of the two surfaces lying in front of one another at a predetermined distance corresponding to the width of the structural elements to be obtained, means for driving in unison the two surfaces so that they execute simultaneous equal downward movements through the vertical portions of their paths, transversal bars projecting to the outside of each surface at predetermined equal intervals through a distance such that each pair of cooperating bars when engaging simultaneously the channel defined between the two vertical portions of said paths may register accurately and form the bottom of an elementary mold, lateral walls closing the channel formed between the two surfaces in the vertical portion of their paths, means for dropping material adapted to set into the upper end of said channel between the two vertical portions of the paths and means for removing the finished elements from the lower part of the said passage, means for inserting cores at regular intervals into the uppermost mold compartments defined by the moving walls and the last bars that have entered the channel between same for forming the bottom of said mold compartment, last mentioned means including slopes arranged to either side of the vertical portions of the paths of the wall surfaces symmetrically thereof, wheels arranged symmetrically to either side of the vertical wall surfaces and adapted to rotate round horizontal axes parallel to said surfaces and radial jaws fitted yieldingly in said wheels and adapted to guide the cores passing over the slopes into the uppermost mould, a segmental vertically slidable vertical rack cooperating with the jaws on each wheel for urging the cores into the mould and means cooperating with the wall surface driving means for constraining last mentioned wheels and racks to move in unison therewith.

3. A machine for molding plaster of Paris and the like material comprising two endless strips forming through part of their travel two vertical walls lying in front of one another at a constant predetermined distance and including means rigid therewith forming separations between successive elementary molds defined between said vertical walls, means for closing laterally said molds, means for driving the strips at a uniform speed, means for dropping the material to be molded into the upper end of the space defined between the two vertical walls and means for removing the molded parts from the lower end of said space between the two walls, an arcuate channel opening into at least one side of the upper end of the associated vertical walls, a wheel rotating coaxially with said arcuate slot, means for feeding cores into said arcuate slot, means resiliently carried by the rotary wheels for guiding the downward movement of the cores from said feeding means through the arcuate slot up to a point between the two vertical walls, a vertical stationary slideway arranged laterally of the vertical mold walls, a plurality of superposed outwardly rack-shaped members adapted to move downwardly in said slideway, at least one pinion controlling the racks on said members and means controlled by the strip driving means for controlling simultaneously the wheel and pinion, said rack-shaped members being provided with lateral notches registering with predetermined vertical planes parallel to the vertical mold walls, means whereby the cores fed by the arcuate slots are held in the notches of the rack-shaped members as the latter sink while the guiding members therefor are urged back out of engagement with said cores and means associated with the lower part of the slideway through which the cores may be removed out of the notches in the rack-shaped members and out of the molded parts formed between the vertical strip walls defining the molds.

GABRIEL STANISLAS BOUVIER.
ROGER PIERRE CLAIR.

REFERENCES CITED

The following references are of record in the file of this patent:

UNITED STATES PATENTS

| Number | Name | Date |
|---|---|---|
| 965,006 | Pauly | July 19, 1910 |
| 1,289,275 | Sargent | Dec. 31, 1918 |
| 1,374,173 | Andrews | Apr. 12, 1921 |
| 1,550,428 | Corl | Aug. 18, 1925 |
| 1,671,078 | McManus | May 22, 1928 |
| 1,727,580 | White | Sept. 10, 1929 |
| 1,751,430 | Thomson | Mar. 18, 1930 |
| 1,786,837 | Farnham | Dec. 30, 1930 |
| 1,842,875 | Lindsay | Jan. 26, 1932 |
| 1,894,676 | Dresser | Jan. 17, 1933 |
| 1,941,812 | Muntz | Jan. 2, 1934 |
| 2,018,192 | Sexton | Oct. 22, 1935 |
| 2,076,315 | Albrecht | Apr. 6, 1937 |
| 2,176,945 | Roberts | Oct. 24, 1939 |
| 2,395,920 | Grotenhuis | Mar. 5, 1946 |

FOREIGN PATENTS

| Number | Country | Date |
|---|---|---|
| 1,188 of 1914 | Great Britain | Jan. 14, 1915 |